US006612495B2

(12) United States Patent
Reddersen et al.

(10) Patent No.: US 6,612,495 B2
(45) Date of Patent: *Sep. 2, 2003

(54) MULTIPLE-INTERFACE SELECTION SYSTEM FOR COMPUTER PERIPHERALS (75) Inventors: Brad R. Reddersen, Eugene, OR (US); Phillip W. Shepard, Eugene, OR (US); Rockie D. Moch, Eugene, OR (US); Jon Paul Charles Williams, Eugene, OR (US)

(73) Assignee: PSC Scanning, Inc., Eugene, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 09/964,253

(22) Filed: Sep. 25, 2001

(65) Prior Publication Data

US 2002/0130181 A1 Sep. 19, 2002

Related U.S. Application Data (63) Continuation of application No. 09/268,263, filed on Mar. 15, 1999, now Pat. No. 6,293,467, which is a division of application No. 08/955,864, filed on Oct. 21, 1997, now Pat. No. 5,905,249, which is a continuation of application No. 08/706,736, filed on Sep. 9, 1996, now Pat. No. 5,703,347, which is a continuation of application No. 08/305,517, filed on Sep. 13, 1994, now Pat. No. 5,563,402, which is a continuation-in-part of application No. 08/039,606, filed on Mar. 25, 1993, now Pat. No. 5,347,113, which is a continuation-in-part of application No. 08/034,189, filed on Mar. 22, 1993, now Pat. No. 5,330,370, which is a continuation of application No. 07/788,267, filed on Nov. 4, 1991, now abandoned.

(51) Int. Cl.⁷ .......................... G06F 17/00; G06F 19/00; G06K 7/10

(52) U.S. Cl. ............................ 235/462.15; 235/462.13

(58) Field of Search ................. 235/462.13, 462.15, 235/462.07; 439/59, 65, 68, 502, 620

(56) References Cited

U.S. PATENT DOCUMENTS

| 4,543,450 A | 9/1985 | Brandt ........................ 179/2 |
|---|---|---|
| 4,579,407 A | 4/1986 | Shimada ...................... 339/29 |
| 4,621,189 A | 11/1986 | Kumar et al. ................ 235/472 |
| 4,678,288 A | 7/1987 | Lonsdale et al. ............ 350/432 |
| 4,686,506 A | 8/1987 | Farago ........................ 340/347 |
| 4,694,182 A | 9/1987 | Howard ...................... 250/566 |
| 4,699,447 A | 10/1987 | Howard ...................... 350/6.9 |
| 4,820,193 A | 4/1989 | Noorily ...................... 439/488 |
| 4,861,972 A | 8/1989 | Elliott et al. ................ 235/462 |
| 4,866,257 A | 9/1989 | Elliott et al. ................ 235/436 |
| 4,868,375 A | 9/1989 | Blanford .................... 235/462 |
| 4,889,497 A | 12/1989 | Riches ........................ 439/76 |
| 4,902,244 A | 2/1990 | Endo et al. ................. 439/489 |

(List continued on next page.)

Primary Examiner—Karl D. Frech
(74) Attorney, Agent, or Firm—Stoel Rives LLP (57) ABSTRACT An interface selection and configuration system for a computer peripheral in which configuration for the peripheral and/or the host interface is at least in part accomplished by the interface connector cable. In a preferred embodiment, the computer peripheral is equipped with one or more hardware interfaces. The interface connector cable has a first end connector for attaching to the computer peripheral. The first end connector of the interface connector cable is typically a multiple pin connector constructed and arranged to be properly physically and electrically connectable only to a specific computer peripheral or class of computer peripherals, the first end connector including at least one electrical connection between two pins for completing a circuit within the computer peripheral thereby enabling the computer peripheral. Where the peripheral is a data reading device such as a laser scanner or RFID reader, alternate or additional configuration may be obtained, with data reading device, from the label on the interconnect cable. The label, which may for example be a bar code or RFID tag, contains information or instructions by which the data reading device (and/or the host) is configured.

16 Claims, 5 Drawing Sheets

U.S. PATENT DOCUMENTS

| | | | |
|---|---|---|---|
| 4,915,639 A | 4/1990 | Cohn et al. | 439/188 |
| 4,941,845 A | 7/1990 | Eppley et al. | 439/505 |
| 4,954,101 A | 9/1990 | Nelson | 439/502 |
| 4,972,470 A | 11/1990 | Farago | 380/3 |
| 5,040,993 A | 8/1991 | Krug et al. | 439/75 |
| 5,092,793 A | 3/1992 | Stephan | 439/446 |
| 5,115,120 A | 5/1992 | Eastman | 235/462 |
| 5,181,858 A | 1/1993 | Matz et al. | 439/188 |
| 5,189,291 A | 2/1993 | Siemiatkowski | 235/472 |
| 5,200,597 A | 4/1993 | Eastman et al. | 235/455 |
| 5,214,268 A | 5/1993 | Doing | 235/472 |
| 5,218,187 A | 6/1993 | Koenck et al. | 235/675 |
| 5,222,164 A | 6/1993 | Bass, Sr. et al. | 385/14 |
| 5,239,662 A | 8/1993 | Danielson et al. | 395/800 |
| 5,250,792 A | 10/1993 | Swartz et al. | 235/472 |
| 5,258,604 A | 11/1993 | Behrens et al. | 235/462 |
| 5,305,181 A | 4/1994 | Schultz | 361/680 |
| 5,313,053 A | 5/1994 | Koenck et al. | 235/472 |
| 5,330,370 A | 7/1994 | Reddersen et al. | 439/502 |
| 5,347,113 A | 9/1994 | Reddersen et al. | 235/462 |
| 5,563,402 A | 10/1996 | Reddersen et al. | 235/436 |
| 5,664,229 A | 9/1997 | Bhargava et al. | 395/885 |
| 5,671,374 A | 9/1997 | Postman et al. | 395/309 |
| 5,675,139 A | 10/1997 | Fama | 235/472 |
| 5,703,347 A | 12/1997 | Reddersen et al. | 235/472 |
| 5,745,794 A | 4/1998 | Poloniewicz et al. | 395/882 |
| 5,763,865 A | 6/1998 | Swift et al. | 235/472 |
| 5,875,415 A | 2/1999 | Lieb et al. | 702/122 |
| 5,905,249 A | 5/1999 | Reddersen et al. | 235/462.15 |
| 6,036,098 A | 3/2000 | Goldman et al. | 235/486 |
| 6,293,467 B1 * | 9/2001 | Reddersen et al. | 235/462.15 |

* cited by examiner fig. 1 fig. 2

_fig.3_

_fig.4_ fig.9 fig.10 fig.12 fig.11 fig.13 fig.14 fig.15

MULTIPLE-INTERFACE SELECTION SYSTEM FOR COMPUTER PERIPHERALS

RELATED APPLICATIONS

This application is a continuation of Ser. No. 09/268,263 filed Mar. 15, 1999 U.S. Pat. No. 6,293,467, which is a divisional of Ser. No. 08/955,864 filed Oct. 21, 1997 U.S. Pat. No. 5,905,249, which is a continuation of Ser. No. 08/706,736 filed Sep. 9, 1996 U.S. Pat. No. 5,703,347, which is a continuation of Ser. No. 08/305,517 filed Sep. 13, 1994 U.S. Pat. No. 5,563,402, which is a continuation-in-part of application Ser. No. 08/039,606 filed Mar. 25, 1993 U.S. Pat. No. 5,347,113, which is a continuation-in-part of Ser. No. 08/034,189 filed Mar. 22, 1993 U.S. Pat. No. 5,330,370, which is a continuation of application Ser. No. 07/788,267 filed Nov. 4, 1991, abandoned.

BACKGROUND OF THE INVENTION

The field of the present invention relates to interconnection systems for computers and computer peripherals or more specifically, methods and devices for selecting proper interface between a computer peripheral and its host interface such as may include a computer.

Host computers need to be interconnected to a wide variety of peripheral devices including printers, scanners, monitors, and controllers among others. When the host computer is being connected to a certain type of peripheral, for example a handheld laser scanner, the computer typically has a single input/output connector to which the scanner may be connected by an interconnect cable. It is frequently desirable that a particular handheld scanner be usable with a variety of different host computers. Conversely, it is also desirable that the host computer be able to support a variety of different handheld scanners.

Heretofore there have been several systems for achieving proper configuration between the host computer and the peripheral, In a typical system, a particular peripheral is configured to work with a particular host computer or terminal, that is, the peripheral has contained a single dedicated interface. Similarly, the host computer was configured to accept only a particular type of peripheral. Any time the peripheral was moved to a different host computer, it was necessary to replace the interface software and hardware in the peripheral.

The host computer may include a software selection program in which the user inputs information identifying the particular peripheral enabling the system to have proper operation. Such an operation requires the user to correctly input information into the host computer identifying the particular peripheral. Alternately, means are provided for scanning a code on the outside of the peripheral which informs the computer of the type of peripheral. Some peripherals actually include identifying signals which again inform the particular host of the type of peripheral and software provides the desired configuration. Many of these systems still require correct interface hardware.

In another configuration technique, the peripheral includes interface hardware for more than one host computer. When configuring, the printed circuit board of the peripheral requires certain hardware configuration in order to be correctly linked to a host computer. Such hardware configuration may be effectuated by manually actuable external switches or by internal switches or "jumpers" within the printed circuit board (and/or within the host computer) which activate or deactivate certain components. Such an operation typically requires the expertise of an electronics technician or skilled user and is not a desirable field operation to be performed by the typical user. It is desirable to have an inexpensive and easy to use interconnection system which can be effectively used by the average user.

SUMMARY OF THE INVENTION

The present invention relates to an interface selection system for a computer peripheral in which configuration for the peripheral and/or its host is at least in part accomplished through the interface connector cable. In a preferred embodiment, the computer peripheral is equipped with one or more hardware interfaces. The interface connector cable has a first end connector for attaching to the computer peripheral. The first end connector of the interface connector cable is typically a multiple contact connector (such as pin or edge connector) constructed and arranged to be properly physically and electrically connectable only to a specific computer peripheral (or class of computer peripherals), and a specific host interface the cable connector including at least one electrical connection between two contacts for completing a circuit within the computer peripheral thereby enabling the computer peripheral.

In another preferred embodiment where the peripheral is a data reading device such as a laser scanner or an RF identification receiver, alternate or additional configuration may be provided by obtaining, with the data reading device, information from the label on the interconnect cable. The label, which may for example be a bar code, contains information or instructions by which the data reading device (and/or the host) is configured.

DESCRIPTION OF THE PREFERRED EMBODIMENTS

The preferred embodiments will now be described with reference to the drawings.

Figure 1:
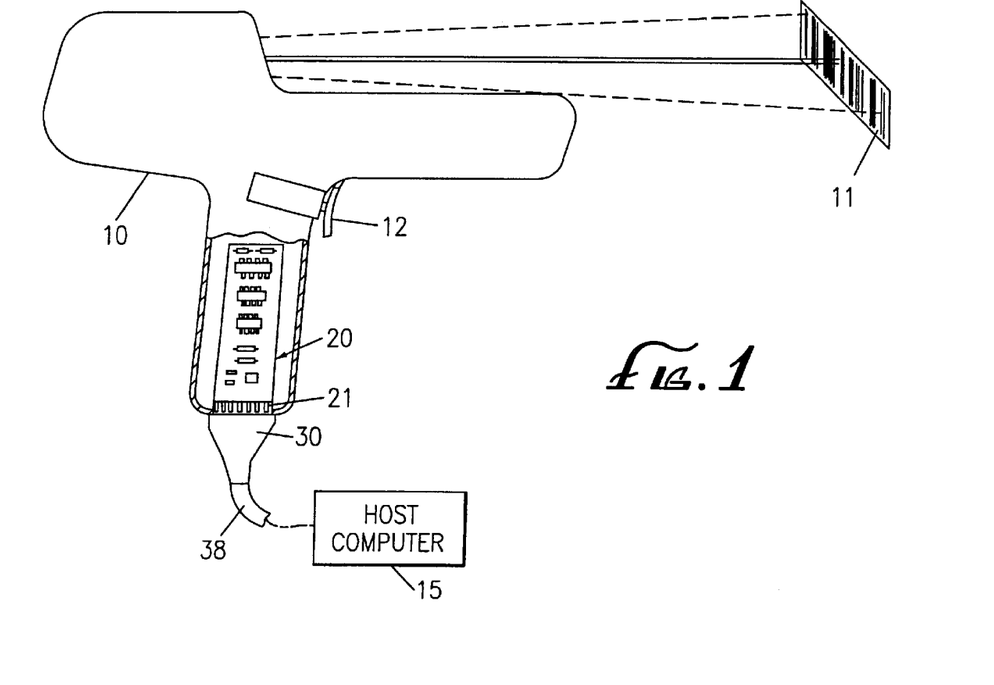
FIG. 1 is a diagrammatic view of a handheld laser scanner attached to a host computer according to the present invention.

In FIG. 1, an example computer peripheral is illustrated as a handheld laser scanner 10 used for scanning a bar code 11. The scanner 10 is operably connected to a host interface (diagrammatically illustrated as a computer 15) via an interconnect cable 38. The interconnect cable 38 includes an end plug or edge connector 30 which connects to a mating connector 21 on the end of a printed circuit board 20 within the scanner 10. The interconnect cable 38 provides a communication link between the host computer 15 and the laser scanner 10 and may also provide power to the scanner 10.

Figure 2:
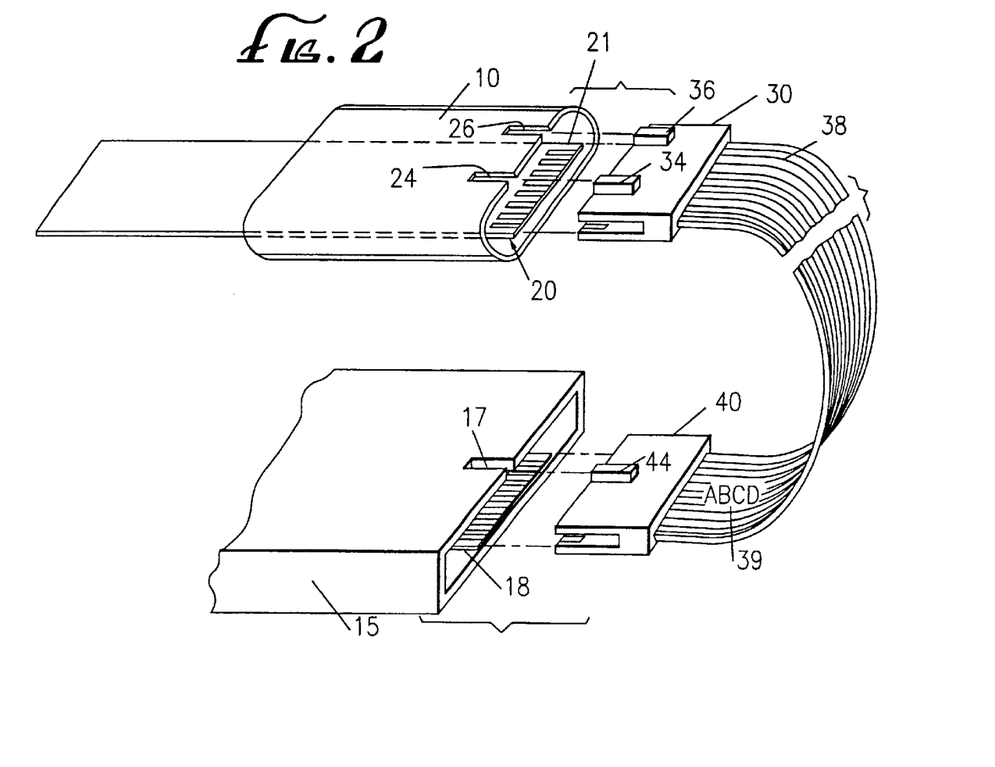
FIG. 2 is a diagrammatic view of an interface connector system according to the present invention.

Referring to FIG. 2, the interconnect cable 38 has a first end connector 30 which plugs into the scanner 10 attaching to the edge connector 21 of the circuit board 20, and a second end connector 40 which plugs into the host computer 15 attaching to the edge connector 18. The first end connector 30 includes tabs 34, 36 which slide into and mate with corresponding slots 24, 26 in the body of the handle of the scanner 10. Different types of scanners may be equipped with different positions of the slots 24, 26. Only an end connector 30 having the correct configuration of tabs 34, 36 will be correctly physically connectable to the scanner 10. An interconnect cable 38 without the correct tab configuration cannot physically be plugged into the scanner 10.

Similarly on the host computer side of the interconnect cable 38, the second end connector 40 is equipped with a tab 44 which mates with a corresponding slot 17 at the mating edge connector 18 of the host computer 15. Only an end connector 40 having the correct configuration of the tab 44 will be correctly physically connectable to the host computer 15. An interconnect cable 38 without the correct tab configuration cannot physically be plugged into the host computer 10.

Therefore in order to connect a particular peripheral (such as a laser scanner 10) to a particular host computer, a cable having the correct tab configurations at both end connectors must be selected. The unique physical configurations ensures that the user must select the correct cable for the host computer and peripheral pair. The preferred embodiment may only require tab configuration on the host computer end because it is not anticipated that the various handheld scanners will require the dedicated interconnect cables, but tab configurations on the peripheral end may be desired in other peripheral applications. Further, the tab configurations illustrated are but one example means for ensuring proper interconnect cable selection. The tabs and slots are readily added to conventional end connectors. The design illustrated does not prevent end connectors without tabs from connecting to the peripheral 10 and the host computer 15, but such design may be modified by one skilled in the art (such as by reversing the positions of the slots/tabs) to prevent such connection.

Figure 3:
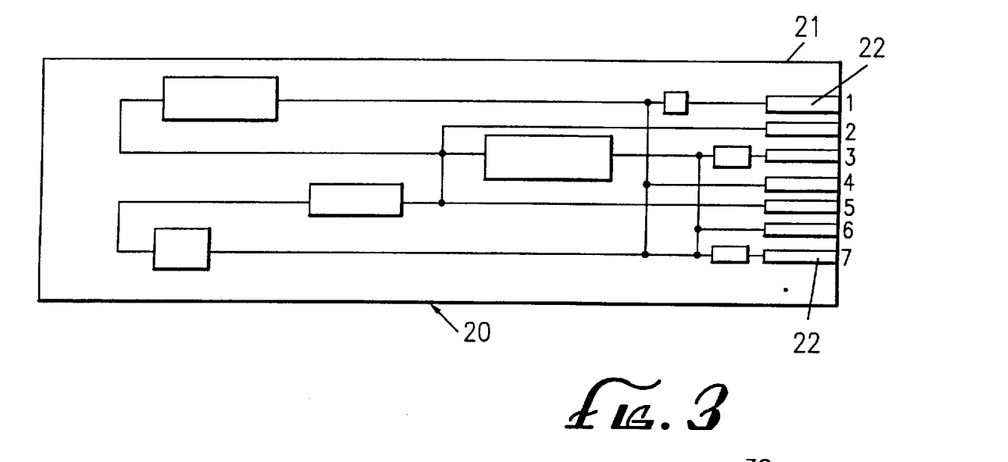
FIG. 3 is a detailed diagrammatic view of a printed circuit board of FIG. 2.
Figure 4:
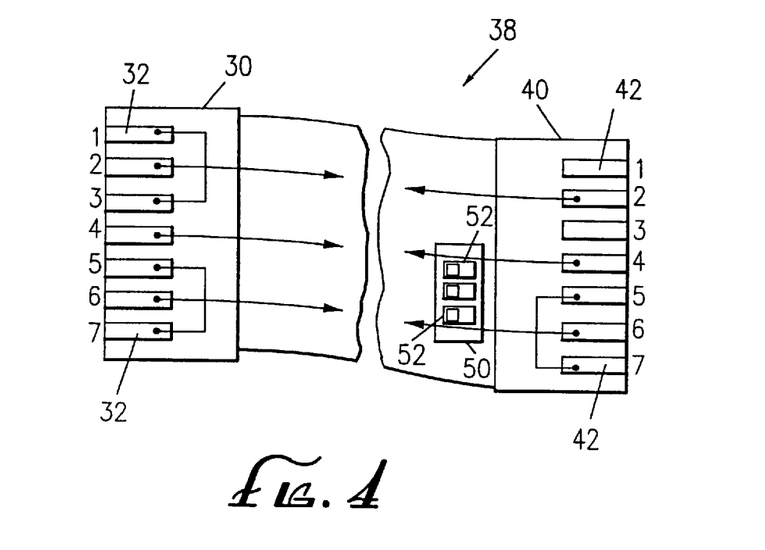
FIG. 4 is a detailed diagrammatic view of an edge connector as in FIG. 2.

Referring to FIGS. 3 and 4, the printed circuit board (located within the scanner 10) includes an edge connector 21 shown with seven edge contacts 22 (numbered 1 through 7). Though there is a distinction between edge contacts and pins, for the purposes of the present invention, they are interchangeable—a pin connector with its mating plug connector may be interchanged for an edge connector pair or any other suitable electrical contact pair.

The board 20 is designed and constructed to be operable with a number of host computers by way of an externally activated hardware configuration provided by the interconnect cable 38. As viewed in FIG. 4, in the edge connector 30, the edge contacts #5 and #7 are electrically connected, illustrated as being "jumped". Edge contacts #1 and #3 are also jumped while edge contacts #2, #4 and #6 are used for communication. When the interconnect cable 38 is plugged into the printed circuit board 20, edge contacts #1 and #3 of the edge connector 21 are thereby electrically connected, and edge contacts #5 and #7 are also electrically connected. By so electrically connecting these electrical contacts, certain circuits within the circuit board 20 become electrically connected resulting in a desired configuration. The scanner 10 becomes configured to accept a particular host computer 15. The user has configured the scanner merely by plugging in the correct interconnect cable 38.

A similar configuration selection system may alternately or in combination be applied to the host computer connection side. The edge connector 40 has certain of its edge contacts 42 electrically connected, in the illustrated example pins #5 and #7 of the edge connector 40 are jumped. When the edge connector 40 is plugged into the edge connector 18 of host computer 15, edge contacts #5 and #7 within the edge connector 18 become electrically connected, completing a circuit within the host computer 15, thereby configuring the host computer 15 for the particular peripheral. The user may therefore configure the host computer 15 for the particular scanner 10 by merely selecting and plugging in the correct interconnect cable 38.

In practice, the user would be provided with a single peripheral, such as a scanner and several interconnect cables. To connect the scanner, the user would merely select the interconnect cable corresponding to the particular host computer and plug it into the scanner. The interconnect cable would then configure the scanner for the particular host computer. To move the scanner to a different host computer, the user would merely have to switch cables. The interconnect cable 38 may be provided with means for identifying such as identifying markings 39 imprinted directly on the interconnect cable 38 itself, color coding, a label with identification information connected to the cable 38, or the like to assist the user in selecting the correct interconnect cable for the given host.

The illustrated seven edge connector embodiment is a simplified example for a connector design. Electrical contact configurations may of course be more or less than seven contacts (and the two ends need not be the same). In a preferred scanner application, an interconnect cable plug with 30 pins is set forth in Table A as follows:

TABLE A

| Pin # | Signal Name | Data Direction(s) |
|---|---|---|
| 1 | TEST_DATA | <--------> |
| 2 | READ_DATA_WAND | --------> |
| 3 | START_DATA | <-------- |
| 4 | CLOCKIN | <-------- |
| 5 | CLOCKOUT | <-------- |
| 6 | RDATA_RTN | --------> |
| 7 | SDATA_RTN | <-------- |
| 8 | CLOCK_IN_RTN | <-------- |
| 9 | CLOCK_OUT_RTN | <-------- |
| 10 | VCC | <-------- |
| 11 | VCC_OUT | --------> |
| 12 | VCC_IN | <-------- |
| 13 | CLEAR_TO_SEND | |
| 14 | TRANSMIT_DATA | |
| 15 | RETURN_DATA | |
| 16 | RETURN_S | |
| 17 | DATA_PLUS | |
| 18 | DATA-MINUS | |
| 19 | BEEP_IN | |
| 20 | PWR_EN | |
| 21 | TRIGGER | |
| 22 | BAR_CODE_OUT | |

TABLE A-continued

| Pin # | Signal Name | Data Direction(s) |
|---|---|---|
| 23 | GOOD_READ_IN | |
| 24 | START_OF_SCAN | |
| 25 | MTR_FAIL | |
| 26 | GROUND | |
| 27 | CONFIG_1 | |
| 28 | CONFIG_2 | |
| 29 | CONFIG_3 | |
| 30 | CONFIG_4 | |

The interconnect cable plug may use certain of the pins for communication or power. Some of the pins may be unused and available for other applications, it being desirable that the same pin design be usable for different configurations. The last four pins #27–#30 are dedicated for providing the configuration for the peripheral. The variations of configurations are limitless and may be designed to suit a particular application. The example in Table A is provided in part to show the wide variety of configurations that may be employed. By the cable configuration scheme, the peripheral may be configured setting for example communication baud rate, bit setting (8-bit, 16-bit etc.), parity or some other parameter.

Though particular types of end connectors have been described, the pin connector may be any suitable electrical connector means for providing electrical contact including plugs, pin connectors, sockets, edge connectors and the like. The end connector has multiple contacts, the contacts providing the actual electrical contact surface. The contacts may be pins, edge contacts, plugs, sockets, or any suitable electrical contact element.

The center of the interconnect cable 38 may comprise any suitable transmission medium including a wire (as illustrated), cable, fiber optic cable, radio frequency link, infra red light link, or other transmission medium.

The cable configuration system described may be combined with other configuration systems, some of which have been previously described. For example, the interconnect cable system described herein may be used to automatically select a configuration for a certain class or group of peripherals. The peripheral may additionally include external (or internal) switches identifying the particular peripheral within the group thereby completing the described configuration.

In practice, a computer peripheral such as a laser scanner 10 will be equipped with hardware and firmware so that it may be used with a plurality of different host computers or computer terminals. To provide initial configuration or change configuration when switching host computers, the peripheral is configured merely by selecting the correct interconnect cable 38. The electrically connected pins in the end connector of the interconnect cable provide the switching necessary within the scanner 10, activating or deactivating certain circuits, thereby configuring the scanner 10 for the particular host computer.

The interconnect cable 38 may be designed in any suitable manner. In FIGS. 3 and 4 illustrate jump connections between the respective edge contacts 32 of edge connector 30 (or edge contacts 42 of edge connector 40), other electrical connection mechanisms may be employed. The contacts may be electrically connected by a simple hard wire connection. The interconnect cable 38 itself may include a printed circuit board 50, preferably in a unitary structure, which may provides the desired electrical connection between the pins. The interconnect cable 38 (or the printed circuit board 50 thereon) may itself be equipped with dip switches 52 (dual inline package switches) or some other type of switch. An interconnect cable equipped with switches would have certain advantages as only one cable version need be manufactured. The cable type corresponding to a particular peripheral would be selected by setting the switches (by the manufacturer or by the skilled user) and the cable could then stamped with an identifying code 39.

As described above, the handheld data reader or other computer peripheral is generally connected by a connector cable to a given host or interface. The host or interface is typically a host computer such as a central processing unit (CPU) or other intermediate device which in turn communicates with the CPU. The host may be a communication module, such as an RF transmitter which is provides a radio frequency communication link to the host computer. In such an application, the cable is nonetheless connected to the host computer or CPU albeit through the communication module. If the peripheral is a printer for example, the host may be a network interface, into which the connector cable is plugged, which is in turn connected to the host computer.

Figures 13, 14:
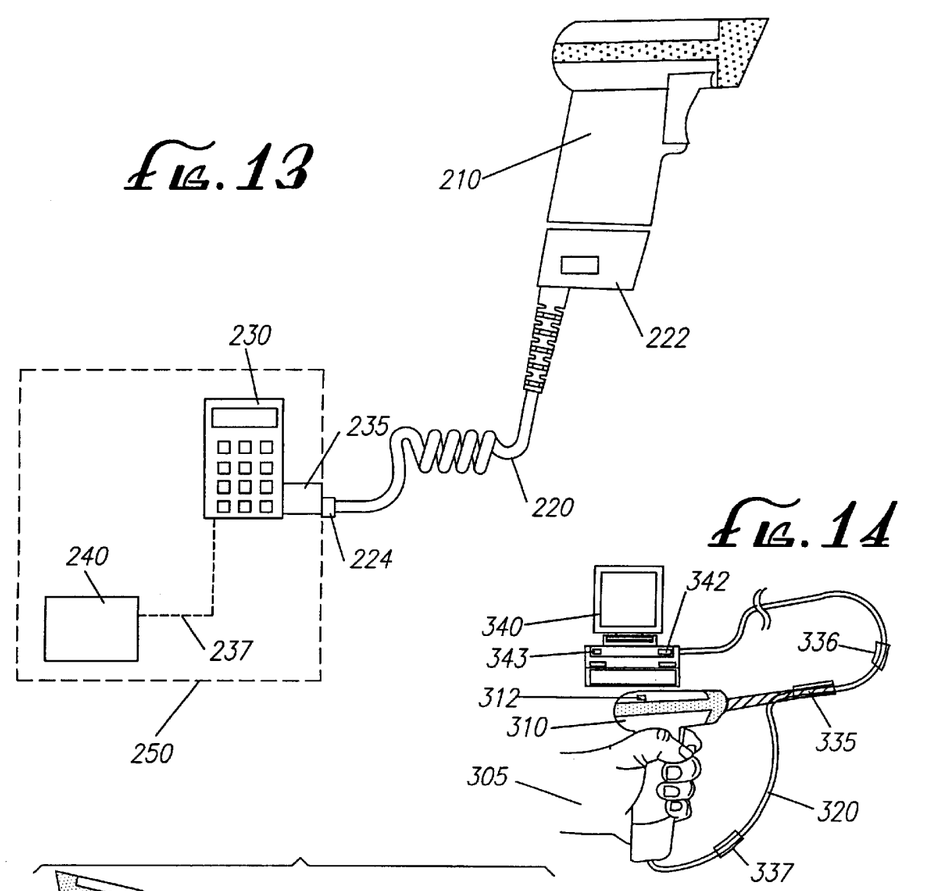
FIG. 13 illustrates an alternate cable connection embodiment.
FIG. 14 illustrates a cable scanning code operation.

There are myriad of potential hosts for a given peripheral. By way of another example, FIG. 13 illustrates a system in which a handheld bar code scanner 210 is connected to a key entry terminal 230. The interconnect cable 220 has a first end connector 222 plugged into the handheld bar code scanner 210. The second end connector 224 is actually plugged into a translator module 235 (sometimes called a "wedge") which converts the signal transmitted from the scanner 210 into a signal of the same form as that produced by the key entry terminal 230. The key entry terminal 230 is in turn connected by a suitable communication link 237 to the central processing unit 240. In this arrangement, the host is literally the wedge 240 but may be also be considered to comprise a host assembly contained within the dashed-lined box and designated by numeral 250.

FIGS. 5–8 illustrate a preferred alternate embodiment in which the peripheral is a handheld data reading device 110 such as a bar code laser scanner, a CCD reader or other device. The scanner 110 is attached to a host, diagrammatically illustrated as a data terminal 140, by a connector cable 120 with a first end connector 122 plugged into the scanner 110 and the second end connector 124 plugged into the data terminal 140. The connector cable 120 is provided with a label 135 which contains encoded data which may be read by the data reader 110. The label 135 may, for example, be a separate tag on which the bar code is imprinted or the bar code may be imprinted directly on the cable 120 itself. As described below, the label may also comprise an RFID tag containing the pertinent programming data.

Figures 5, 6:
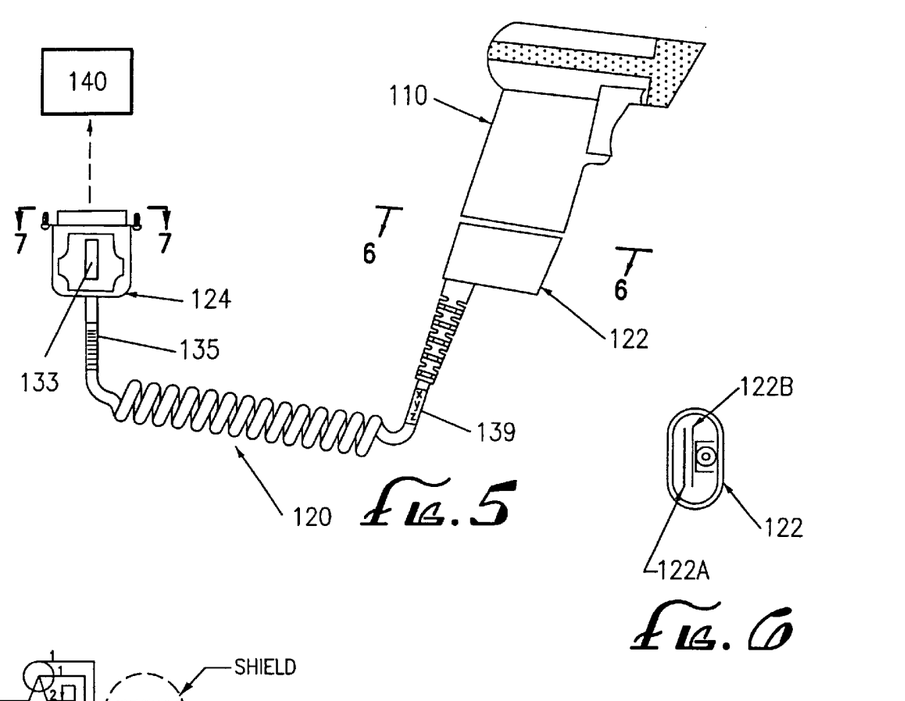
FIG. 5 is a diagrammatic view of an alternate peripheral configuration system.
FIG. 6 is an end view of an end connector in FIG. 5 taken along line 6—6.
Figures 7, 8:
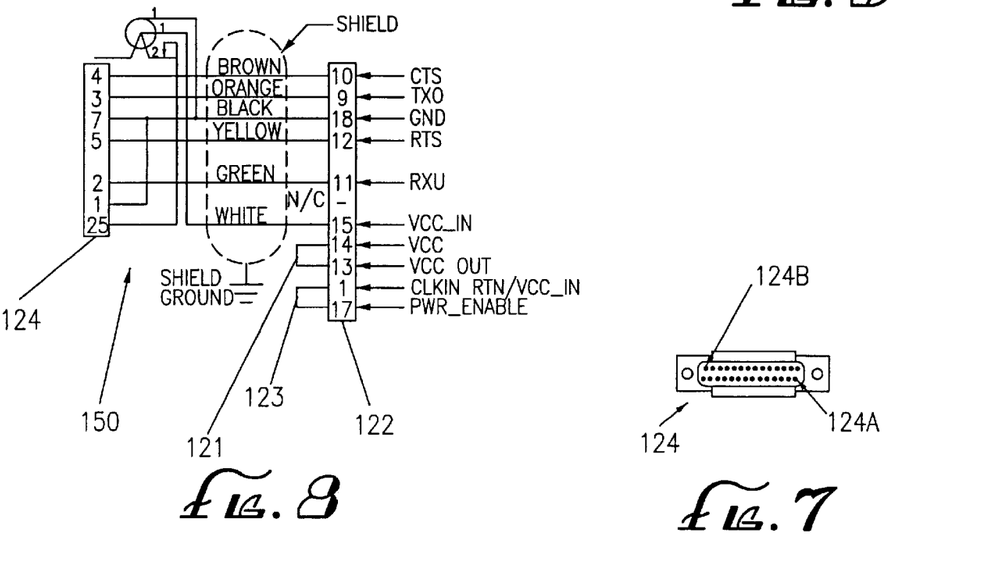
FIG. 7 is an end view of an end connector in FIG. 5 taken along line 7—7.
FIG. 8 is a connector schematic illustrating an example cable connection scheme for the cable connector of FIG. 5.

As best shown in FIG. 6, the first end connector 122 is illustrated as an edge connector having a plurality of edge contacts, including contacts 122a, 122b, for connection into a corresponding connector in the handle of the scanner 110. FIGS. 5 and 7 illustrate the second end connector 124 as a pin connector having a plurality of pins (including pins 124a, 124b) for connection into a corresponding connector in the data terminal 140.

The cable 120 may also include an identification label 139 which has identification information to assist the user in selecting the correct cable for the particular scanner and host pair. Other or alternate selection means such as color coding may be provided to assist the user in selecting the correct interconnect cable for the particular application.

FIG. 8 schematically illustrates an example cable connection scheme 150 for the cable connector 120 of FIG. 5. Color coded cable wires (Brown, Orange, Black, Yellow, Green, White) provide desired electrical communication path between edge contacts (nos. 10, 9, 18 etc.) in the first end connector 122 and respective pin contacts (nos. 4, 3, 7 etc) in the second end connector 124. The cable connector 120 also includes peripheral configuration selection by electrical connector 121 (connecting edge contacts 14 and 13) and by electrical connector 123 (connecting edge contacts 1 and 17).

FIGS. 9–12 illustrate another preferred alternate embodiment in which the peripheral is a handheld data reading device 155 such as a bar code laser scanner, a CCD reader or other device. The scanner 155 is attached to a host (diagrammatically illustrated as a data terminal 180) by a connector cable 160 with a first end connector 162 plugged into the scanner 155 and the second end connector 164 plugged into the data terminal 180. The connector cable 160 is provided with a label 175 which contains encoded data which may be read by the data reader 155. The label 175 may, for example, be a separate tag on which a bar code is imprinted or the bar code label may be imprinted directly on the cable 160 itself. As described in detail below, if required, the user may at least partly configure the scanner 155 merely by scanning the bar code label 175. An internal operation routine within the scanner 155 then configures the scanner itself on the basis of the configuration information provided by the bar code.

Figures 9, 10, 11, 12:
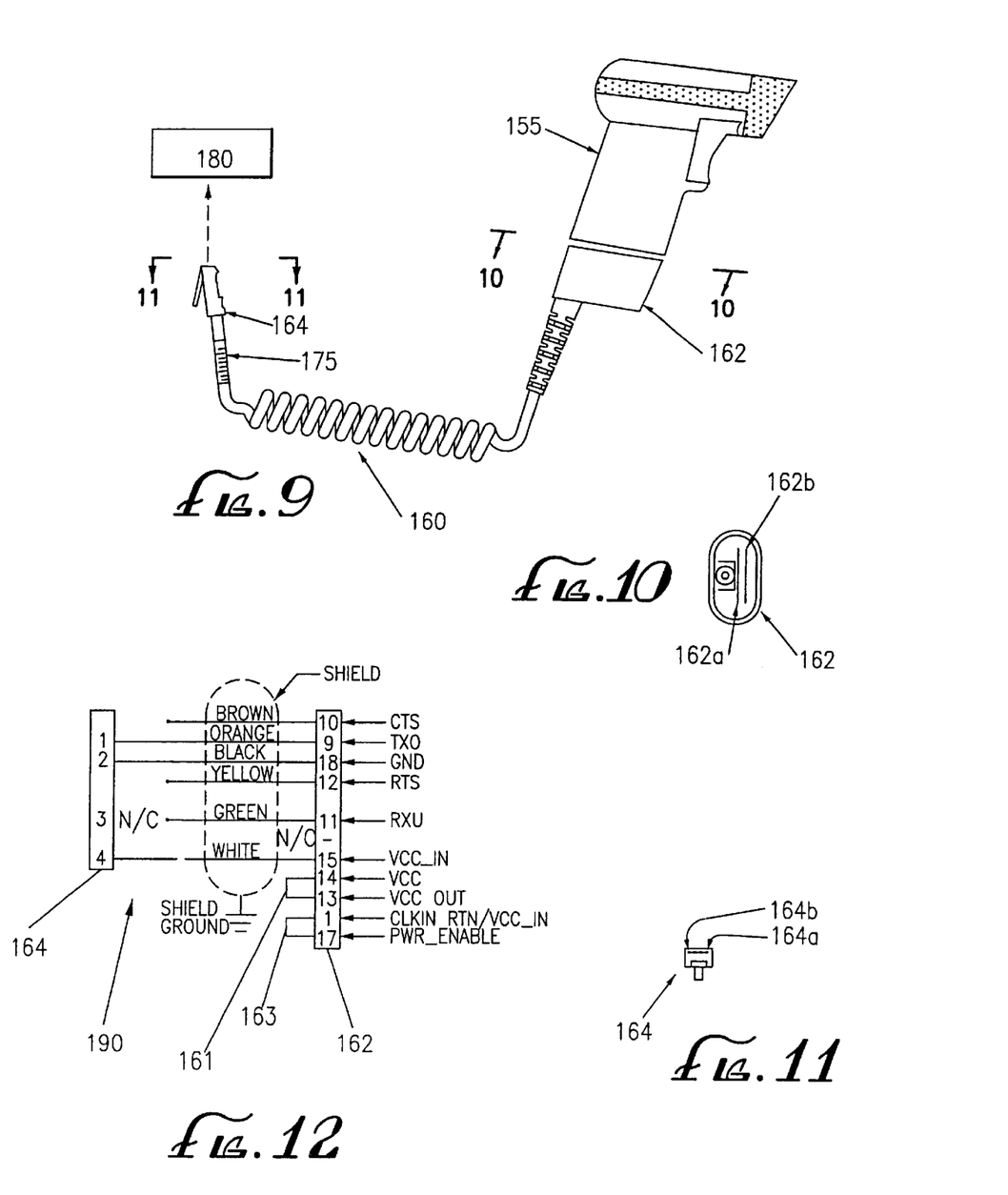
FIG. 9 is a diagrammatic view of an alternate peripheral configuration system.
FIG. 10 is an end view of an end connector in FIG. 9 taken along line 10—10.
FIG. 11 is an end view of an end connector in FIG. 9 taken along line 11—11.
FIG. 12 is a connector schematic illustrating an example cable connection scheme for the cable connector of FIG. 9.

As best shown in FIG. 10, the first end connector 162 is illustrated as an edge connector having a plurality of edge contacts, including contacts 162a, 162b, for connection into a corresponding connector in the handle of the scanner 155. FIGS. 9 and 11 illustrate the second end connector 164 as a plug connector (similar to the type conventionally used on home telephones) having a plurality of wire connectors (including wire connectors 164a, 164b) for connection into a corresponding connector in the data terminal 180.

FIG. 12 schematically illustrates an example cable connection scheme 190 for the cable connector 160 of FIG. 9. Color coded cable wires (Brown, Orange, Black, Yellow, Green, White) provide desired electrical communication path between edge contacts (nos. 10, 9, 18 etc.) in the first end connector 162 and respective contacts (nos. 1, 2, 3, 4) in the second end connector 164. The cable connector 160 also includes peripheral configuration selection by electrical connector 161 (connecting edge contacts 14 and 13) and by electrical connector 163 (connecting edge contacts 1 and 17).

In the preferred embodiment of the present invention as shown in FIG. 14, the data reader device 310 is further (or alternately) configured by reading a label having encoded data thereon such as a configuration bar code 335 which is placed on the interconnect cable 320. By reading the configuration code 335, the scanner 310 (and/or the host 340) is configured for the particular application on the basis of the encoded instruction data by means of an internal configuration routine within the scanner 310 or the host 340.

U.S. Pat. Nos. 4,866,257 and 4,861,972 (herein incorporated by reference) disclose examples on how a scanner may be configured by scanning a bar code or by downloading information from a host computer. Once the bar code has been scanned or the control information, the configuration information is stored in a memory (preferably a non-volatile memory such as EEPROM) in the scanner so that repetitive configuration is not required and the configuration of the scanner is not lost when power is turned off. Typically, the bar codes are contained in the user manual and the user must obtain the manual and then select the correct bar code to be scanned. However, according to the preferred embodiment shown in FIG. 14, the user 305 need only select the correct interconnect cable 320 and the correct bar code label 335 to be scanned is automatically selected since it is on the cable itself. Moreover, being on the cable, the bar code is readily accessible and locatable without having to locate the user manual. Though once the system has been initially configured, the system will preferably store the configuration information, if it becomes necessary to reconfigure, the configuration bar code 335 remains readily accessible on the cable 320.

In order to ensure that a scanner is not inadvertently reconfigured, a configuration switch may be provided which must be actuated to place the scanner in programming mode. Once the switch is actuated the scanner enters programming mode enabling the programming label 335 on the cable to be read and configure the scanner. The switch may be a hardware switch such as a dip switch 312 (see FIG. 14) on the housing of the scanner 310. Alternately, programming mode may be entered (and exited if desired) by a soft switch such as a switch label 337 located on the cable 320. Though the configuring bar code conveniently appears on the interconnect cable, configuration bar codes (i.e., the same bar code as appearing on the cable as well as additional bar codes) may nonetheless be provided in the user manual to allow the user to configure the peripheral as desired such as to specific user optional settings. Alternately, the programming label may be positioned on the host computer or terminal. Such a location may be less desirable since different scanners may be plugged into the same host, possibly requiring different programming labels. Alternately, the program switch label may be positioned on the host as shown by the label 342 on the host 340 of FIG. 14. The user would then scan the label 342 to switch to programming mode and then scan the programming label 335 on the cable 320.

Configuration on the basis of the encoded data instructions obtained by reading the label or bar code 335 may be accomplished by a suitable internal configuration routine. For example, the routine may configure by way of selecting proper internal switch settings or by selecting and running a given protocol program. The data reader preferably stores its configuration parameters in a non-volatile programmable memory such as EEPROM. These parameters may be set by manual programming or reset by the configuration routine. The instructions from the label may cause the software in the data reader to execute a series of commands resulting in the setting (or resetting) of the EEPROM-stored parameters.

Configuration selection or parameters change or set a particular function for the peripheral. Possible configuration selections or parameters may include, by way of example for a handheld scanner:

interface identification (for a laser scanner, may include Undecoded, IBM 4683, OCIA, RS-232, Wand Emulation, etc.);

communication parameters such as baud rate (2400 baud, 9600 baud etc.); data format settings (parity, stop bits, data bits), hardware handshaking (CTS/RTS), software handshaking (Xon,Xoff), intercharacter delay (none, 10 ms, 20 ms etc.), UPC Data Format (UPA-A, UPC-E, Check Digit, Number System Digit);

system specific parameters (prefixes, suffixes, symbology identifiers, etc.);

reading restrictions, the instructions might restrict the set of codes options that the decoder may have to handle; by restricting the reading options, the operation speed of the "autodiscrimination" algorithm (the means by which the decoder figures out which code it is seeing) may be increased as compared to requiring the algorithm to consider all code types.

The preferred actual location on the cable for the encoded label will depend upon the particular application.

Referring to FIG. 5 for example, the label 135 is located adjacent the second end connector. An alternate location is directly on the second end connector 124 as shown by symbol label 133 on end connector 124. If the second end connector 124 is too small to practically accommodate the label 133 or if the connection location to the data terminal 140 provides inconvenient access, the label 135 may preferably be located up the cable connector 120 at a suitable distance from the second end connector 124. In general, it is impractical to locate the label 135 on the first end connector 122 or immediately adjacent thereto because when the first end connector 122 is plugged into the scanner 155, the scanner 155 cannot be oriented to scan a label located immediately adjacent the first end connector 122.

Nonetheless, in certain applications it may be desirable to locate the label 135 near the first end connector 122. If the connector cable 120 is relatively long, for example 50 feet (15 meters), the label may be preferably positioned about 2 feet (60 cm) from the first end connector 122. Such a position is close enough to be easily located but far enough to allow convenient access. Such a location is illustrated in FIG. 14 where the bar code label 335 is located on the cable 320 at a convenient distance from scanner 310.

Figure 15:
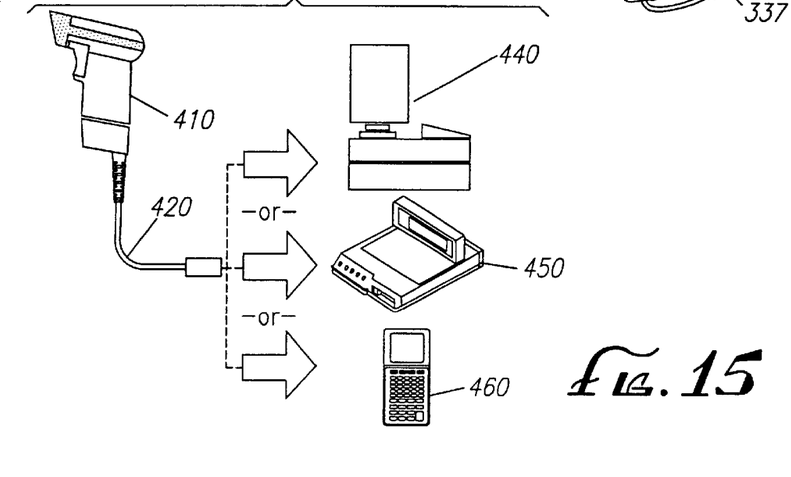
FIG. 15 illustrates various peripheral/host pairs.

Though the cable connector configuration embodiment and the cable connector data reader configuration embodiment may be used separately to configure the peripheral, the embodiments may be combined together to provide a comprehensive and readily implemented configuration procedure. By way of example, FIG. 15 illustrates a peripheral shown as a laser scanner 410 is equipped with a multi-interface architecture which allows any one of many different types of host interfaces (such as a data terminal 440, a fixed scanner or other point of sale unit 450, or a handheld key entry unit 460) to be selected for a particular scanner. A cable 420 is selected corresponding to the particular scanner 410 and the desired host interface (440, 450, 460) pair. In practice, the user is supplied with a plurality of specific connector cables which correspond to the possible scanner/host pairs which the customer may have.

When plugged into the scanner, the cable 420 itself selects a certain configuration scheme in the scanner 410. The cable 420 may also configure the host interface. The cable 420 may be equipped with physical connector elements to ensure that only the correct cable may be even physically plugged into the host. Once plugged into the scanner and the host, using the scanner itself, the operator then scans the label on the cable which completes or confirms scanner/host configuration.

Besides the bar code label, there are other types of labels or tags containing information which may be obtained by a reader device. One such label or tag is an RFID tag (radio frequency identification tag). The RFID tag is normally passive, but when activated or prompted by a signal from a interrogator, the RFID tag emits a signal with its information to a receiving device. In one alternative embodiment, the cable 320 may include a label 336 comprising an RFID tag instead of a bar code. The scanner 310 may comprise an RFID tag interrogator/receiver (either exclusively or in combination with a bar code scanning mechanism) which prompts the RFID tag 336 for its data and receives the data. The data is then used to set internal configuration, function or the like. The programming RFID tag process may be initiated for example by actuating the programming switch 312 on the device 310. Alternately, programming may be automatically initiated upon power up or power down of the device 310. In the power up example, when the device is powered up, the programming frequency signal would be emitted and upon receipt the RFID tag would emit its signal transmitting programming data to the device. Such a system would not require the user to perform any act except plug in the correct cable and turn on the data reader and the data reader itself would obtain the proper configuration information (for example) from the RFID tag on the cable and in this example configure itself for the host device such as by selecting the proper internal parameter.

An RFID programming tag 343 may alternately be located on the host device itself. By activating the programming sequence, the device 310 may receive the data from the tag 343 identifying the host device 340 allowing the peripheral device to be configured for that host device.

Thus, a peripheral configuration system and method have been shown and described. Though certain examples and advantages have been disclosed, further advantages and modifications may become obvious to one skilled in the art from the disclosures herein. The invention therefore is not to be limited except in the spirit of the claims that follow.

We claim:

1. A data reading system comprising:
   a handheld terminal;
   a translator module plugged into the terminal;
   a cable plugged into the translator module;
   a handheld data reader connected to the translator module via the cable,
   wherein the translator module interfaces the data reader to the handheld terminal.

2. A data reading system according to claim 1 further comprising
   a central processing unit;
   a communications link for providing communication between the handheld terminal and the central processing unit.

3. A data reading system according to claim 1 wherein the data reader is selected from the group consisting of: a bar code scanner, a CCD reader, and an RFID tag reader.

4. A data reading system according to claim 1 wherein the cable comprises a printed circuit board equipped with switches which may be set for changing operation of the cable.

5. A portable data reading system comprising:
   a handheld terminal having a housing including an externally accessible connector;
   a translator module removably plugged into the connector on the handheld terminal;
   a handheld data reader connected to the handheld terminal via the translator module, the data reader reading an optical code and generating an electrical signal corresponding thereto for transmitting to the handheld terminal,
   wherein the translator module converts the signal transmitted from the data reader into a signal of the same form as that produced by the handheld terminal.

6. A portable data reading system according to claim 5 wherein the data reader is selected from the group consisting of: a bar code scanner, a CCD reader, and an RFID tag reader.

7. A portable data reading system according to claim 5 further comprising a cable for connecting the data reader to the handheld terminal.

8. A portable data reading system according to claim 5 wherein the cable has a first end plugged into the translator module and a second end plugged into the data reader.

9. A portable data reading system according to claim 5 further comprising a bar code label containing configuration data, wherein the data reader is laser bar code scanner, wherein scanner obtains the configuration data by scanning the bar code label and uses the configuration data to change a function of the scanner.

10. A method of data reading comprising the steps of:
providing a handheld terminal with an externally accessible connector;
plugging a translator module into the connector on the handheld terminal;
connecting a portable data reader to the translator module, the translator module converting a signal from the data reader into a form accepted by the handheld terminal.

11. A method according to claim 10 further comprising the step of interfacing the data reader to the handheld terminal via the translator module.

12. A method according to claim 10 further comprising the step of
activating the data reader and the handheld terminal;
obtaining the data from the label with the data reader;
setting a function of the data reading system on the basis of the data obtained from the label.

13. A method according to claim 12 wherein the label comprises a bar code label and the data reader comprises a barcode reader.

14. A method according to claim 12 wherein the label comprises a radio frequency identification tag and the data reader comprises a radio frequency identification reader.

15. A method according to claim 10 wherein the data reader comprises a handheld laser scanner.

16. A method according to claim 10 further comprising connecting the data reader to the translator module via a cable.

* * * * *

UNITED STATES PATENT AND TRADEMARK OFFICE
CERTIFICATE OF CORRECTION

PATENT NO. : 6,612,495 B2
DATED : September 2, 2003
INVENTOR(S) : Brad R. Reddersen et al.

It is certified that error appears in the above-identified patent and that said Letters Patent is hereby corrected as shown below:

Column 1
Line 38, "peripheral," should read -- peripheral. --.

Column 3
Line 52, insert -- 20 -- after "printed circuit board".

Column 4
Line 49, "TEST DATA" should read -- TEST_DATA --;
Line 50, "READ DATA WAND" should read -- READ_DATA_WAND --;
Line 51, "START DATA" should read -- START_DATA --.

Column 5
Line 67, "may provides" should read -- may provide --.

Column 6
Line 9, before "stamped" insert -- be --;
Line 16, before "provides" delete "is".

Signed and Sealed this

Third Day of August, 2004

JON W. DUDAS
*Acting Director of the United States Patent and Trademark Office*